(12) United States Patent
Wilsher et al.

(10) Patent No.: US 7,190,876 B2
(45) Date of Patent: Mar. 13, 2007

(54) IMAGE INPUT SCANNER HAVING A WAVEGUIDE PLATEN

(75) Inventors: Michael John Wilsher, Letchworth (GB); Eric John Le Sueur, Wembley (GB)

(73) Assignee: Xerox Corporation, Stamford, CT (US)

( * ) Notice: Subject to any disclaimer, the term of this patent is extended or adjusted under 35 U.S.C. 154(b) by 37 days.

(21) Appl. No.: 11/145,671

(22) Filed: Jun. 6, 2005

(65) Prior Publication Data

US 2006/0275014 A1 Dec. 7, 2006

(51) Int. Cl.
*G02B 6/10* (2006.01)

(52) U.S. Cl. .................. 385/146; 385/15; 385/901

(58) Field of Classification Search .............. 385/146
See application file for complete search history.

(56) References Cited

U.S. PATENT DOCUMENTS

| 5,696,865 | A | * | 12/1997 | Beeson et al. | 385/146 |
| 6,244,509 | B1 | * | 6/2001 | Klevtsov | 235/454 |
| 6,409,088 | B1 | * | 6/2002 | Klevtsov | 235/473 |
| 6,608,961 | B2 | * | 8/2003 | Travis | 385/146 |
| 2004/0105025 | A1 | * | 6/2004 | Scherling | 348/335 |

* cited by examiner

*Primary Examiner*—Michelle Connelly-Cushwa
*Assistant Examiner*—Kajli Prince
(74) *Attorney, Agent, or Firm*—R. Hutter

(57) ABSTRACT

In an apparatus for recording an image, a light transmissive waveguide defines a thick end, a thin end, and a main plane disposed between the thick end and the thin end. An image-recording device is disposed adjacent the thick end of the waveguide, the image-recording device being capable of recording a two-dimensional image. The light-transmissive waveguide and the image recording device are arranged whereby the image recording device records an image placed on at least a portion of the main plane.

9 Claims, 3 Drawing Sheets

IMAGE INPUT SCANNER HAVING A WAVEGUIDE PLATEN

INCORPORATION BY REFERENCE

The following US Patent is hereby incorporated in its entirety for the teachings therein: U.S. Pat. No. 6,608,961.

TECHNICAL FIELD

The present disclosure relates to apparatus for recording a hard-copy image as digital image data, such as in an image input scanner as would be found, for example, in a digital copier.

BACKGROUND

Image input scanners, which record images on one or more hard-copy sheets as digital data, are well known such as in digital copiers and stand-alone scanners. An original image on a sheet, which is desired to be recorded as digital image data, is placed on a platen. A platen is basically a light-transmissive member that supports the sheet bearing the image. The sheet on the platen is illuminated, typically with light passing through the platen, and the light reflected from the image on the sheet is collected by a photosensitive imaging device, such as a charge-coupled device (CCD). The imaging device is typically disposed on the opposite side of the platen as the sheet, and moves relative to the platen to scan the image.

U.S. Pat. No. 6,608,961 describes an optical element that is operated as a display. The optical element is a light-transmissive waveguide defining a main surface, a thick end, and a thin end. When an image is projected into the thick end, the projected image is displayed on the main surface.

SUMMARY

According to one aspect, there is provided an apparatus for recording an image. A light transmissive waveguide defines a thick end, a thin end, and a main plane disposed between the thick end and the thin end. An image-recording device is disposed adjacent the thick end of the waveguide. The light-transmissive waveguide and the image recording device are arranged whereby the image recording device records an image placed on at least a portion of the main plane.

BRIEF DESCRIPTION OF THE DRAWINGS

In the various Figures showing various embodiments, like reference numbers indicate like or equivalent elements.

DETAILED DESCRIPTION

Figure 1:
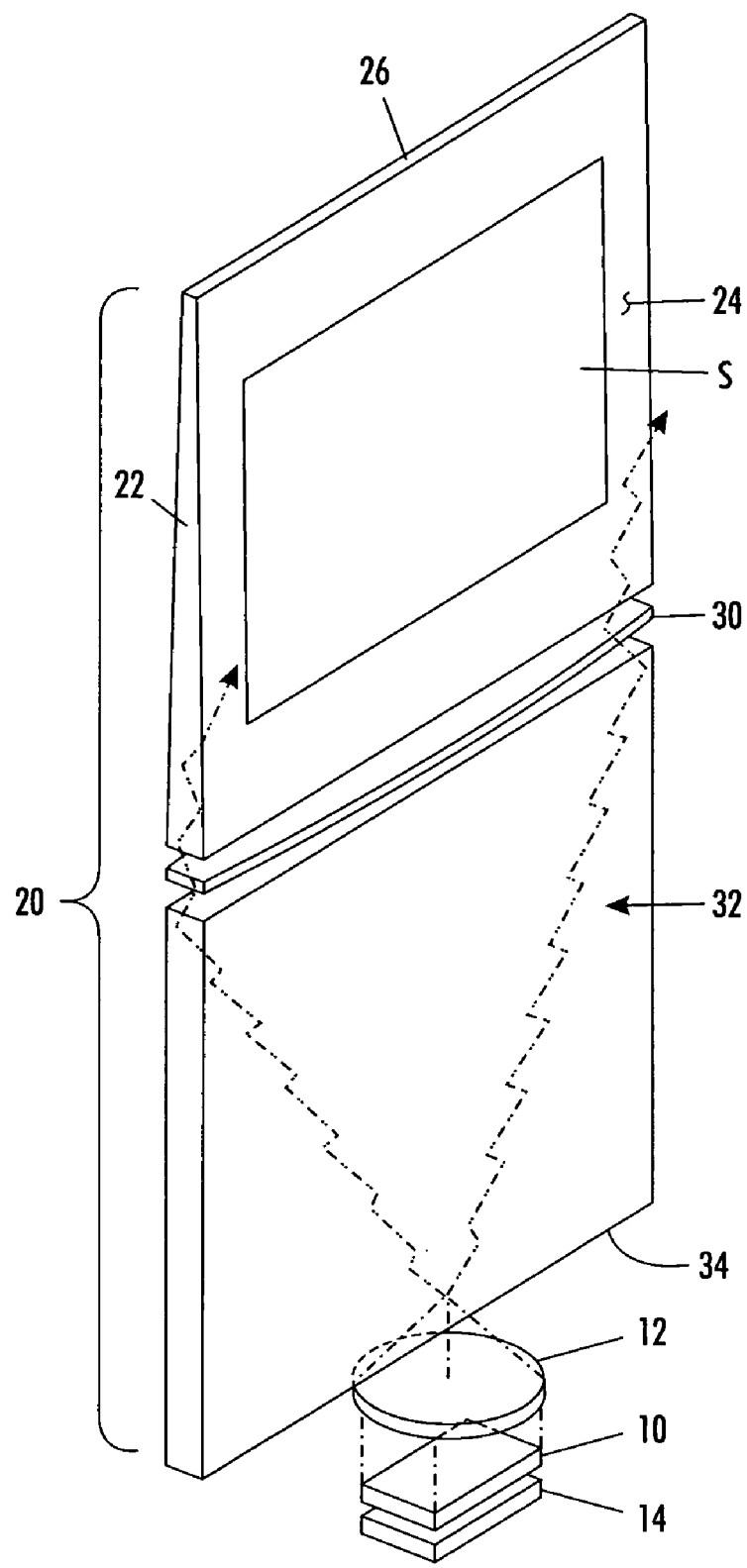
FIG. 1 is a simplified perspective view of portions of an image input scanner.

FIG. 1 is a simplified perspective view of portions of an image input scanner. The embodiment includes an image recording device 10, in the form of a two-dimensional photosensitive imaging device of a generally known design, such as a CCD or other device. The image recording device 10 is arranged to receive light, through lens 12, from what is here generally called a waveguide 20; although in the present embodiment the waveguide 20 may include distinct parts, as described herein the waveguide 20 optically acts as a single member.

The waveguide 20, in this embodiment, includes three portions: a tapered portion 22, which defines at least one main plane 24, as well as what can be called a "thin end" 26; a central collimating lens 30, and what can here be called a "slab waveguide" 32, which ends in what can be called a "thick end" 34. Even if waveguide 20 were fashioned from a single member, it would still define a main plane 24, thin end 26, and thick end 34.

The waveguide 20 is structured, such as in terms of its index of diffraction and other properties, so that light reflected from an image on a sheet placed on a portion of main plane 24 (particularly toward thin end 26) will be recordable by the image recording device 10 through thick end 34. The properties of such a waveguide are described in U.S. Pat. No. 6,608,961 mentioned above with regard to a display; however, in the present embodiment, a waveguide of generally similar properties is used as a platen to support an image-bearing sheet, such as shown as S in the Figure.

Figure 2:
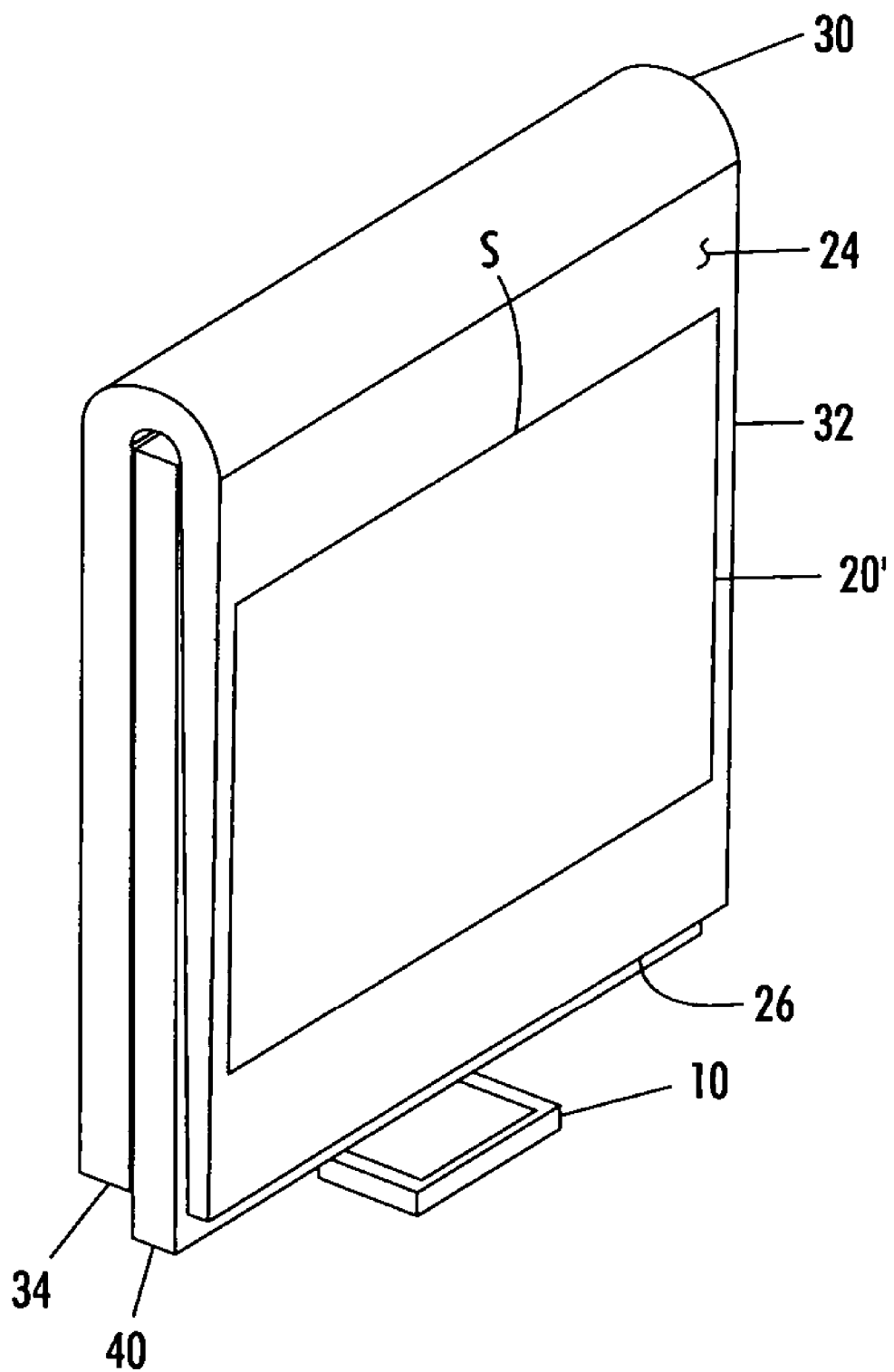
FIG. 2 is a simplified perspective view of portions of another embodiment of an image input scanner.

FIG. 2 is a simplified perspective view of another embodiment, where like numbers indicate like elements to the FIG. 1 embodiment. Here, the single-piece waveguide 20', once again defining a main plane 24, thin end 26, and thick end 34, is in effect "folded," nonetheless providing sufficient area on main plane 24 to support an image-bearing sheet S, as shown. This configuration of waveguide 20 also facilitates light reflected from sheet S being collected by image recording device 10. Further, a light source 40 for emitting light that can be reflected from a sheet S placed on main plane 24 can be disposed in the "fold" of the waveguide 20, as shown. Such a light source 40 could be, for example, largely in the form of an LCD backlight panel, as generally known in the art.

Figure 3:
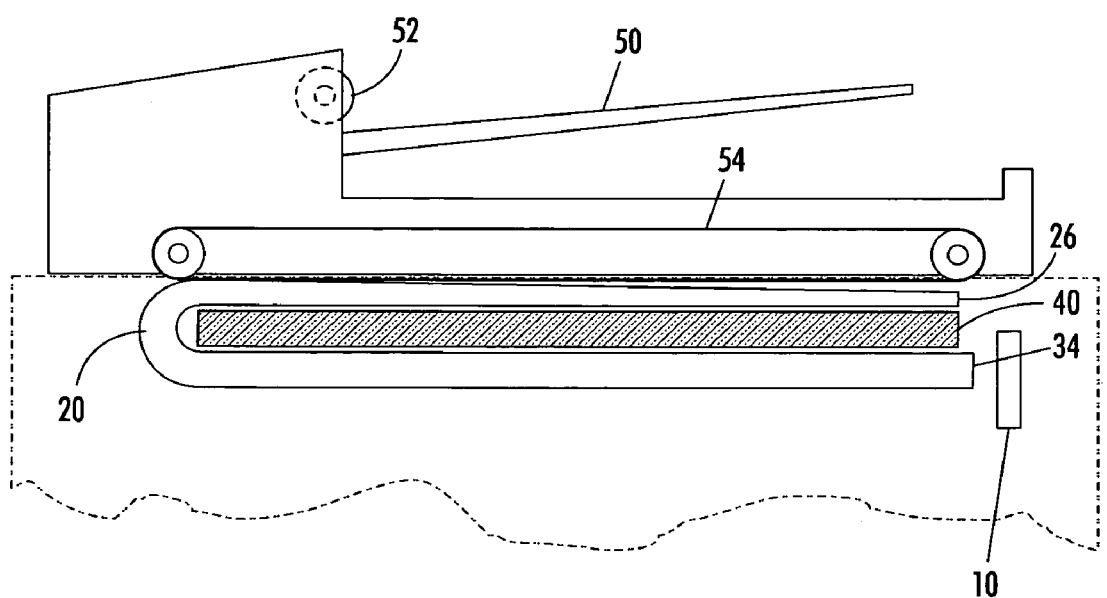
FIG. 3 is a simplified plan view of portions of an image input scanner having a document handler.

FIG. 3 is a simplified plan view showing portions of an image input scanner using a waveguide such as shown in FIG. 2, in combination with a "full-width belt"-type document handler for successively placing a series of individual sheets on the main plane 24 for recording by image recording device 10. Sheets to be recorded are initially loaded in an input tray 50, from which each sheet is successively drawn by head 52 into a space between the main plane 24 and the full-width belt 54. Each sheet is typically momentarily paused when it is in full contact with the relevant portion of main plane 24. After recording by image recording device 10, each sheet is then directed, by motion of belt 50, into a receiving tray (not shown).

Although FIG. 3 shows a full-width-belt type document handler, the waveguide platen 20 can be used with a document handler of a type familiar in digital copying, wherein each sheet is exposed only through a narrow window, and the imaging device records successive lines of the image on the sheet as the sheet moves past the window. Such an arrangement is useful with a substantially one-dimensional linear array of photosensors forming image recording device 10.

The image recording device 10 can be of a monochrome or color type. It is possible that a monochrome imaging device can be used in conjunction with a light source 40 that is capable of emitting filtered light of three primary colors sequentially to obtain a full-color image from the monochrome image recording device 10. Another variation is to provide an actuator, such as 14 in FIG. 1, which can move the image recording device 10 slightly (in either an x- or-y-direction, or both) during exposure of a stationary sheet S, so as to obtain a higher effective spatial resolution.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An apparatus for recording an image, comprising:
    a light transmissive waveguide defining a thick end, a thin end, and a main plane disposed between the thick end and the thin end, wherein the light guide is folded to form a first portion forming a substantially tapered waveguide and a second portion forming a slab waveguide;
    a light source disposed substantially between the tapered waveguide and the slab waveguide; and
    an image-recording device disposed adjacent the thick end of the waveguide;
    the light-transmissive waveguide and the image recording device being arranged whereby the image recording device records an image placed on at least a portion of the main plane.

2. The apparatus of claim 1, further comprising at least one prism optically disposed between the tapered waveguide and the slab waveguide.

3. The apparatus of claim 1, further comprising at least one cylinder lens operatively interposed between the waveguide and the image recording device.

4. The apparatus of claim 1, further comprising a lens operatively interposed between the waveguide and the image recording device.

5. The apparatus of claim 1, further comprising a document handler for placing an image-bearing sheet on at least a portion of the main plane.

6. The apparatus of claim 5, wherein the document handler causes the image-bearing sheet to remain momentarily stationary on the portion of the main plane.

7. The apparatus of claim 5, wherein the document handler includes a full-width belt.

8. The apparatus of claim 1, the image-recording device being capable of recording a two-dimensional image.

9. The apparatus of claim 1, further comprising an actuator for moving the image-recording device during exposure.

* * * * *